No. 768,826. PATENTED AUG. 30, 1904.
F. STARR.
CASTRATING TOOL.
APPLICATION FILED OCT. 28, 1903.
NO MODEL.
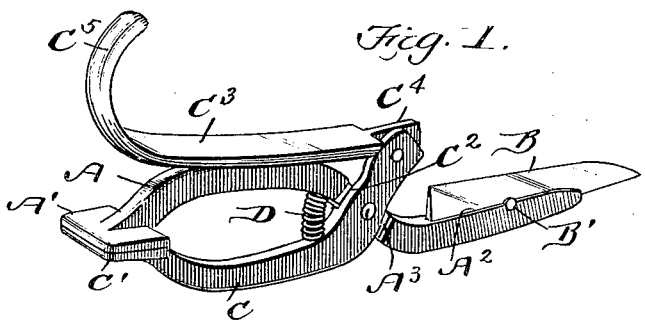
Fig. 1.
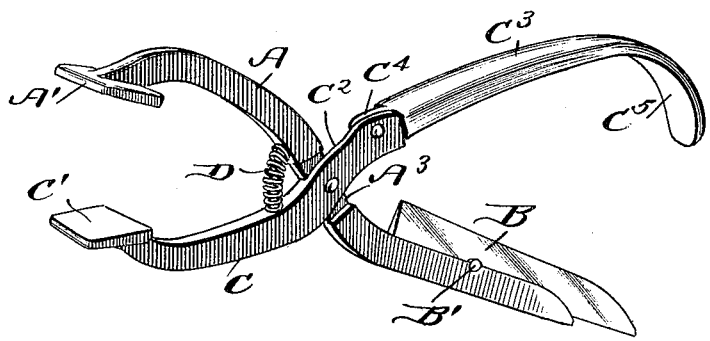
Fig. 2.
Fig. 3.
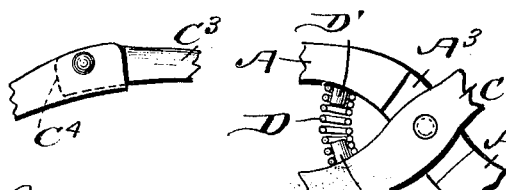
Fig. 5. Fig. 4. Fig. 6.
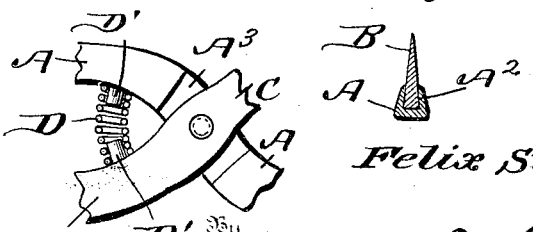
Inventor
Felix Starr.
Witnesses No. 768,826. Patented August 30, 1904.

UNITED STATES PATENT OFFICE.

FELIX STARR, OF FOSSIL, OREGON.

CASTRATING-TOOL.

SPECIFICATION forming part of Letters Patent No. 768,826, dated August 30, 1904.

Application filed October 28, 1903. Serial No. 178,923. (No model.)

*To all whom it may concern:*

Be it known that I, FELIX STARR, a citizen of the United States, residing at Fossil, in the county of Wheeler and State of Oregon, have invented a new and useful Castrating-Tool, of which the following is a specification.

My invention relates to castrating-tools, and has for its object the handy combination, without any unnecessary parts, of a cutting-blade and a pair of coacting grippers, the latter taking the place of the toothed instruments now in common use and which have many objectionable features.

My invention consists of the novel features of construction and combination of parts hereinafter described, and particularly pointed out in the claims.

In the accompanying drawings, Figure 1 is a perspective view of my device, the parts being thrown into position for using the cutting-blade. Fig. 2 is a perspective view of my device, the parts being in position for using the grippers. Fig. 3 is a plan view of my device. Fig. 4 is a detail side elevation showing the manner of securing the spring in place. Fig. 5 is a detail view of construction; and Fig. 6 is a cross-section through the blade, showing the manner in which it is held in place.

In constructing a tool of this kind I employ the compound curved handle A, carrying at one end the gripping-plate A', which plate is formed with a flat under surface. The opposite end portion of the handle A is longitudinally slotted, as indicated at A², in Fig. 6. The central portion of the handle is reduced in thickness, as shown at A³. The slotted or grooved portion A² has inwardly - inclined walls, the distance between said walls being greatest at the bottom of the groove. In this groove slides a wedge-shaped blade B, which blade has a perforation formed therein. The edges of the groove are notched. The blade is placed in position by sliding it in the groove until the perforation of the blade registers with the notched portion of the handle A, and a pin B' is forced into the perforation, the ends of the pin resting in the notches. The coacting curved handle C is shorter than the handle A and carries at one end the gripping-plate C', similar in size and shape to the plate A', and these two plates are adapted to bear the one upon the other. The forward portion of the handle C is reduced in thickness at C², and this reduced portion fits in the reduced portion A³, and the two handles are pivoted together, as clearly shown in the drawings. The handle C is continued by means of a handle portion C³, reduced at one end and the reduced portion pivoted to the forward end of the reduced portion C², as shown at C⁴. The non-reduced end of the handle C³ is curved sharply and serves as a hand-guard, as shown at C⁵. A spiral spring D is arranged between the handles A and C, to the rear of the pivotal portion, the ends of the spring encircling and being secured to lugs D', carried by the handles A and C, respectively.

In use when the knife B is to be used the handle C³ is swung rearward, the back of the handle C³ resting on the back of the rear portion of the handle A, as shown in Fig. 1, the curved portion C⁵ forming a rear guard and preventing the tool from being jerked or wrenched from the hand. When the grippers A' C' are to be used, the handle C³ is thrown forward, resting over the edge of the blade B and the curved portion C⁵ curving downward and acting as a shield or guard for the point of the blade, thus obviating any danger of the hand being cut by the point of the blade should the instrument slip when in use.

From the above description it will be seen that I have a tool of this kind compact and handy in form and simple and durable in construction. It will also be noted that by removing the pin B' the blade can be detached and a new blade inserted or the old blade sharpened and put back in place. The wedge shape of the blade and converging walls of the groove prevent the blade being lifted from the groove, and the pin prevents longitudinal movement of the blade in the groove.

Having thus fully described my invention, what I claim as new, and desire to secure by Letters Patent, is—

1. A tool of the kind described comprising a compound curved handle having a gripper-plate at one end and a cutting-blade at the opposite end, a short handle pivoted to the central portion of the compound curved handle and carrying at one end a gripper-plate adapted to coact with the plate carried by the first-mentioned handle, and a curved handle pivoted to the end of the short handle opposite the gripper-plate, the said last-mentioned handle being adapted to lie back on the rear portion of the first-mentioned handle, and to be thrown forward and cover the blade.

2. A tool of the kind described comprising a handle carrying a blade at one end and one of a pair of grippers at the opposite end, a second blade pivoted to the first and carrying the coacting gripper member, and a curved handle-section pivoted to the second handle, the last-mentioned handle being adapted to rest on the back of the first-mentioned handle when the blade is in use, and to rest over and cover the blade when the grippers are in use, the extreme end of the curved pivoted handle forming a guard for the hand in one position and a shield for the point of the blade in the opposite position.

3. In a tool of the kind described the combination of the handles A and C, of the pivoted handle C³, the last-mentioned handle being curved sharply adjacent the non-pivoted end, of the gripper-plates carried by the handles A and C, the handle A having a longitudinal groove formed in the portion opposite the gripper-plates, the walls of said groove converging inwardly and upwardly, a blade wedge-shaped in cross-section adapted to slide in said groove, the walls of the groove having a notched portion, and a pin fitting through the blade and having its ends adapted to rest in the notched portion of the walls of the groove.

FELIX STARR.

Witnesses:
O. B. ROBERTSON,
JOHN A. COLLIER.